Feb. 21, 1939.     G. R. FOLDS     2,147,695
HEAT MOTOR
Original Filed April 23, 1932   3 Sheets-Sheet 1
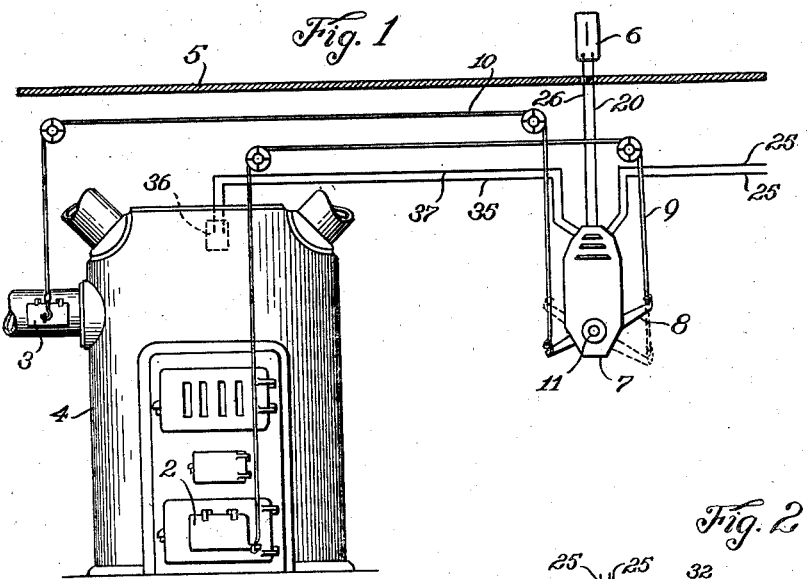
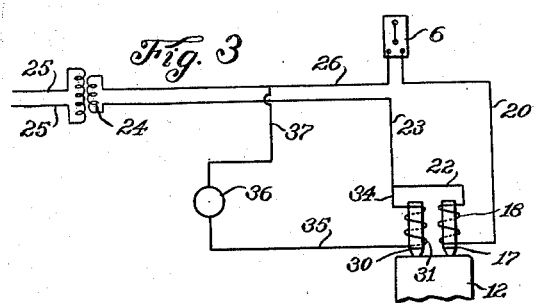
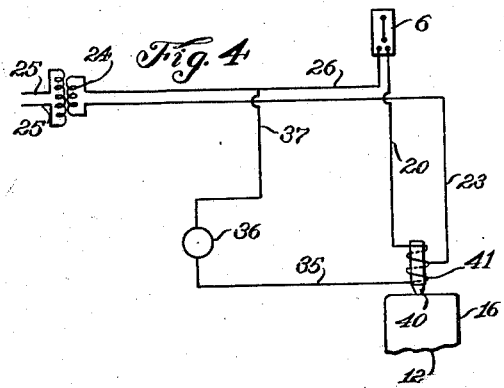
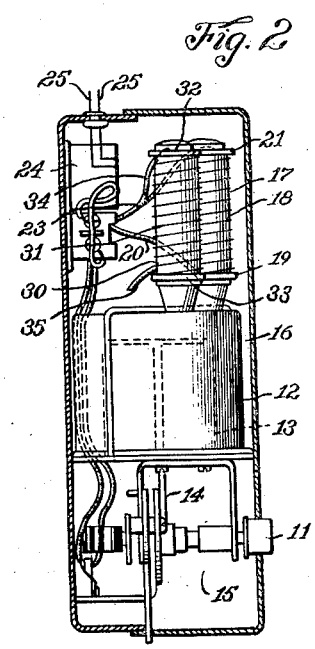
Inventor:
George R. Folds
By Jones, Addington, Ames + Seibold
Attys.

Feb. 21, 1939.  G. R. FOLDS  2,147,695
HEAT MOTOR
Original Filed April 23, 1932  3 Sheets-Sheet 2

Inventor;
George R. Folds,
By; Jones, Addington, Ames & Seibold,
Att'ys.

Feb. 21, 1939.     G. R. FOLDS     2,147,695
HEAT MOTOR
Original Filed April 23, 1932     3 Sheets-Sheet 3

Inventor;
George R. Folds,
By Jones, Addington, Ames+Seibold,
Attys.

Patented Feb. 21, 1939

2,147,695

UNITED STATES PATENT OFFICE 2,147,695

HEAT MOTOR

George R. Folds, Chicago, Ill., assignor to Cook Electric Company, Chicago, Ill., a corporation of Illinois Original application April 23, 1932, Serial No. 607,034, now Patent No. 1,996,237, dated April 2, 1935. Divided and this application May 18, 1934, Serial No. 726,206

7 Claims. (Cl. 60—25)

My invention relates to heat regulators and more particularly to control apparatus for heating systems designed to operate automatically by suitable means, which may be thermostatically or otherwise, to provide substantially uniform or constant temperature at all times.

The present application is a division of my copending application, Serial Number 607,034, filed April 23, 1932 and issued as United States Letters Patent Number 1,996,237 on April 2, 1935.

Usually, in heating systems for homes or the like, a damper controller is employed to actuate the draft and check dampers of the heater, and, in the case of oil or gas furnaces, the controller is arranged to connect with a valve controlling the flow of oil or gas, and, in certain instances, also with the air supply supporting combustion. Where the controller is electrically operated, the circuit is connected to a thermostat responsive to room temperature so that the rate of combustion may be increased until the fire is brought to a point of supplying heat sufficient to satisfy the room thermostat. I find, however, that the temperature of the furnace increases to such an extent that the furnace necessarily continues to supply heat beyond the requirements of the room thermostat before the combustion can be checked. This results in what is known as periodic overshooting of the furnace and causes uneven heating of the room which is undesirable and results in waste of fuel and considerable annoyance.

An object of the invention is to provide a furnace control, which, when the room thermostat calls for heat, will increase the rate of combustion until the furnace temperature reaches a predetermined degree and will thereafter decrease the rate of combustion without checking the combustion until the room thermostat is satisfied.

A further object of the invention is to provide an improved form of furnace control having a valve or damper controller connected to the room thermostat and to the furnace, adapted to operate not only in accordance with the requirements of the room thermostat, but also in accordance with the requirements of a furnace or other thermostat, whereby the combustion is temporarily decreased but not completely checked, so that the continued decreased combustion will supply only that heat which is required to satisfy the room thermostat. Accordingly, the furnace will not continue to supply heat after the room thermostat is satisfied to cause an uncomfortable temperature and an unnecessary waste of fuel.

Many other objects and advantages of the invention will be apparent from the following detailed description when taken in connection with the accompanying drawings which form a part hereof.

In the drawings:

Figure 1 is a view illustrating a furnace or heater with control apparatus embodying my invention applied thereto;

Fig. 2 is a side elevation, with the cover and housing in section removed, of one form of damper controller that may be used;

Fig. 3 is a wiring diagram illustrating the apparatus connected in circuit with a thermostat responsive to temperature of the room or rooms to be heated;

Fig. 4 is a similar view illustrating an alternative form of electrical connections for the control apparatus;

Figure 5:
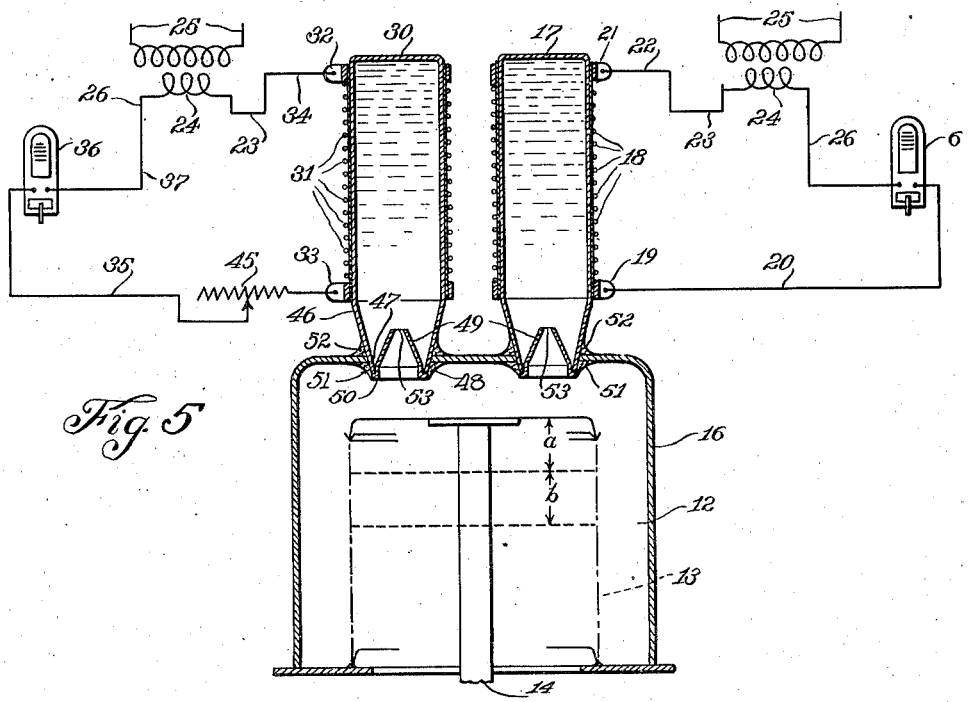
Fig. 5 is an enlarged vertical section of the heat motor of the damper controller shown in Figs. 2 and 3.

To illustrate one possible embodiment of the invention, I have shown in Fig. 1 a furnace 4 having the usual air inlet damper 2 and the check damper 3, but it will be understood that in so far as the disclosure of the invention is concerned, the illustration is merely conventional inasmuch as the invention is capable of wide application and may be used to control elements other than dampers, such as gas valves, steam and hot water valves, or devices other than those in heating systems. The floor of a room to be heated is indicated at 5 and a thermostat 6 is located within the room. A damper controller 7, which may be electrically operated or otherwise, and which may be of common commercial form, such as is described and claimed in United States Letters Patent No. 1,962,292, granted June 12, 1934, to John S. Baker and assigned to the assignee of the present application, is connected by means of a chain 9 to draft damper 2 and by means of a chain 10 to check damper 3, there being a damper arm 8 connecting these chains to the controller. Damper controller 7 is adapted to increase the rate of combustion by moving chains 9 and 10 to open draft damper 2 and to close check damper 3 when electric current is supplied to the controller by actuation of room thermostat 6. When no current is supplied, the controller operates to check combustion by moving the chains in opposite direction.

A push button 11 is provided to disconnect the drive between damper controller 7 and arm 8 to allow independent operation of dampers 2 and 3 during firing of the furnace, or for any other purpose. It will be understood that damper controller 7 may have any suitable form of motor for driving damper lever 8 to operate dampers 2 and 3.

For purposes of illustration, I have shown in Fig. 2 a heat motor 16 having an expansible chamber 12 provided with a movable wall 13 connected to a power arm 14. Arm 14 may be connected to damper lever 8 by a clutch designated generally as 15, which clutch, when operated by push button 11, will disconnect the drive of motor 16 to permit independent operation of dampers 2 and 3.

A detailed description of clutch mechanism 15 and the manner in which push button 11 is arranged to disconnect the drive between motor 16 and damper lever 8 is given in said United States Letters Patent No. 1,962,292, and, consequently, it is deemed unnecessary for a clear understanding of this invention to describe this mechanism more fully.

Heat motor 16 is provided with a pair of heating tubes 17 and 30, both in communication with chamber 12 and both adapted to receive a volatile substance which extends upwardly into these tubes from chamber 12. A portion or all of the volatile substance in these tubes 17 and 30 is adapted to be vaporized by the heat effects of the flow of current through resistance coils 18 and 31 wrapped about these tubes for the purpose of expanding chamber 12 to actuate movable wall 13.

Lower terminal 19 on tube 17 is connected by wire 20 to one terminal of room thermostat 6. The opposite terminal of room thermostat 6 is connected by a wire 26 to transformer 24. Upper terminal 21 on tube 17 is connected by a wire 22 and a wire 23 to transformer 24, the power mains being represented at 25.

Tube 30 has its resistance wire 31 connected between upper and lower terminals 32 and 33. Upper terminal 32 is connected by a wire 34 and by wire 23 to transformer 24. Lower terminal 33 is connected by a wire 35, a switch 36, and a wire 37, to say wire 26 of the opposite side of the circuit. Switch 36 may be thermostatically controlled and may be responsive to the temperature of furnace 4.

Assuming that room thermostat 6 is calling for heat due to a drop in temperature, current will flow from transformer 24 through wire 26, thermostat 6, wire 20, heat coil or resistance wire 18, wire 22, wire 23 and back to transformer 24. Current will also flow from one side of the circuit, say from wire 26 through wire 37, switch 36, wire 35, heat coil 31, wire 34 and back to the other side of the circuit, say wire 23. The heat effects produced by this current flow through resistance wires 18 and 31 will vaporize a portion or all of the volatile fluid in tubes 17 and 30, depressing the level of the unvaporized fluid below the heating zone and expanding chamber 12, thereby driving power arm 14 downwardly to swing lever 8 clockwise. This action of lever 8 operates, say in the embodiment shown in Fig. 1, to open draft damper 2 and to close check damper 3. The reverse movement of dampers 2 and 3 occurs when the increased combustion in the furnace 4 produces sufficient heat to satisfy the demands of room thermostat 6.

To prevent the heat of furnace 4 from overshooting the room temperature demanded by thermostat 6, switch 36 is arranged to open the circuit upon a predetermined rise in temperature of the furnace, which furnace temperature is sufficient upon the opening of thermostat 36 to continue furnishing the heat required to satisfy the room thermostat. The current will discontinue flowing through the circuit of switch 36, and tube 30 will cool to condense the vapor therein and reduce the pressure so that this volatile fluid may again rise in the tube 30 to allow expansible chamber 12 to contract, say, half-way, or any portion of its stroke, as indicated by line b in Fig. 5, in order to swing lever 8 counterclockwise midway or so of its position, depending upon the adjustment desired, between its on and off position whereby to partly close draft damper 2 and slightly open check damper 3, if so desired. It will be understood that the extent of the return movement of lever 8 to alter the closing position of the dampers at this point in the operation of the heater may be predetermined by the capacity of tube 30 with respect to the combined capacities of both tubes. This action may be arranged to allow draft damper 2 to close half way or any other fraction of its completely opened position, if so desired, and likewise, to alter the position of the check damper 3 if so desired.

Furthermore, any number of tubes similar to tubes 17 and 30 may be provided. These tubes may be under the control of different circuits having one or more switches similar to switch 36 so as to vary the degree of closing movement in accordance with the desired continued combustion of furnace 4 after a predetermined furnace temperature is reached to prevent overshooting this furnace temperature as demanded by thermostat 6 whereby to provide a relatively constant room temperature at all times. Moreover, switches 36 may be actuated according to conditions other than furnace temperatures, and may be inserted in control circuits for governing the operation of one or more devices.

After the circuit of switch 36 is opened and draft damper 2 slightly closed, the rate of combustion of the fire will be decreased but the combustion will continue at the decreased rate until the circuit of thermostat 6 is opened. When thermostat 6 opens, tube 17 will cool to condense the vapor and totally relieve the volatile fluid in chamber 12 of vapor pressure so as to allow a portion of the volatile fluid to return in tube 17 and bring lever 8 clockwise to its off position.

As stated above, checking the increased rate of combustion after a predetermined furnace temperature is obtained to prevent overshooting of the furnace by the continued combustion of the fire until room thermostat 6 opens, may be accomplished in various ways. There is illustrated in Fig. 4 heat motor 16 provided with a heating tube 40 having a single resistance wire or heat coil 41 about this tube, but so connected to the circuit of room thermostat 6 and the circuit of switch 36 that after the latter circuit is opened, the heat produced by the current flow through heat coil 41 is reduced sufficiently to allow a return of the volatile substance a part of the way upwardly in this tube in order to return lever 8 to any desired position to alter the open position of draft damper 2, and, if so desired, the check damper 3, or valves if employed. This is accomplished by connecting the circuit of room thermostat 6 to a predetermined number of turns of the upper portion of the heat coil so as to limit the heating zone of tube 40 by the current flowing through the circuit of room thermostat 6. The circuit of switch 36 is connected to the remaining turns of the lower portion of the heat coil so that when current flows through this circuit all the volatile fluid in tube 40 will be vaporized and held depressed in chamber 12 to keep the lever 8 at its full "on" position. This arrangement is obtained by connecting wire 20 of room thermostat circuit to the upper terminal of resistance coil 41 and wire 23 to an intermediate turn of this resistance coil. Wire 35 of the circuit of switch 36 is connected to the lower terminal, the wire 23 forming a common return for both circuits. It is obvious, therefore, that the result of returning damper lever 8 to any intermediate position after the furnace temperature reaches a predetermined degree may be obtained in various ways, and consequently, I do not intend being limited to the specific structures shown.

In Fig. 5, I have illustrated heat motor 16 with resistance coils 18 and 31 of tubes 17 and 30 connected in separate circuits, but with the same reference characters illustrating corresponding parts in each circuit. The showing in Fig. 5 clearly shows how controlling the current flow through resistance coils 18 and 31 will vary the power stroke, either upon contraction or expansion of the wall 13. Characters a and b are shown to represent these distances. When switch 36 opens and the tube 30 cools, the volatile fluid in vessel 16 will rise in and fill tube 30, thereby allowing the vessel 12 to return a distance equal to character b. When switch 6 opens and the tube 17 cools, the volatile fluid in vessel 12 will rise in and fill tube 17, thereby allowing the vessel to return a further distance equal to character a. If it is desired to vary the outward stroke of power arm 14, instead of the return stroke, switch 6 may be arranged to close before or after switch 36. I consider such variations as within the scope of this invention. On the other hand, if it is desirable for any reason whatever to vary the time of action of the heater 30 with respect to the time when the heater 17 should function, by varying the heat input through varying the flow of current, an adjustable resistance 45 may be inserted in either control circuit, or specifically as shown in the control circuit having the switch 36.

Figure 6:
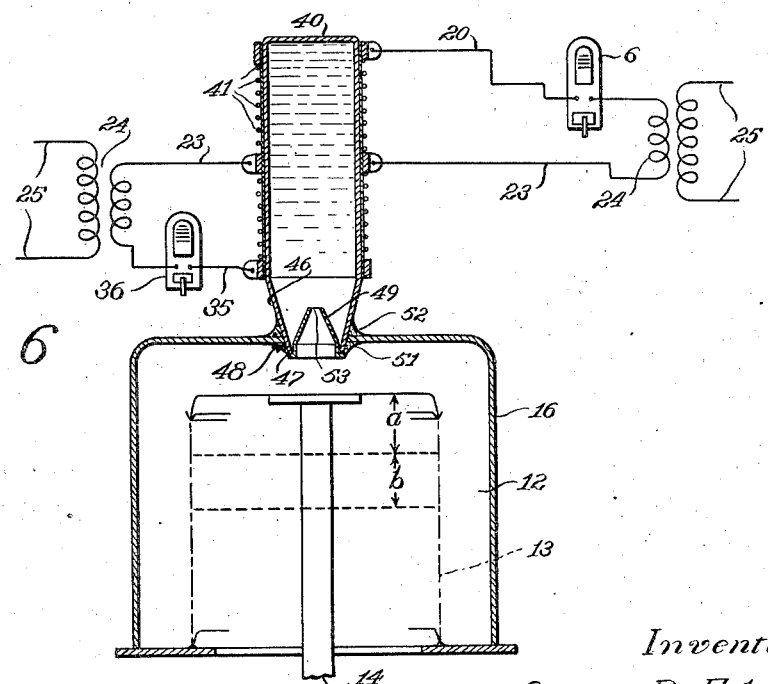
Fig. 6 is a similar view of the alternative form of heat motor shown in Fig. 4.

In a similar manner, Fig. 6 illustrates the distances the wall 13 will expand or contract when the current flows through the various sections of resistance coil 41 of tube 40 and is controlled by switches 6 and 36. For the purposes of illustration, the switches 6 and 36 have been shown in Fig. 6 as incorporated in separate control circuits, but it will be understood that the circuit arrangement may be the same as shown in Fig. 4.

The foregoing description gives a clear understanding of at least one embodiment of the invention. On the other hand, the advantage of this type of heat motor will also be readily understood in connection with various types of systems wherein switch 36 might be located in a different zone than switch 6. To illustrate, outside temperature variations may be utilized to operate switch 36 so that a drop in outside temperature will close switch 36 and operate motor 16 whereby to swing lever 8 a distance proportional to the movement of the motor, which distance is represented say by line "a" in Figs. 5 and 6. The motor will be held at this position as long as the outside temperature remains low. Depending upon the type of heating system, the draft damper or valve will be in a partially open position to keep the furnace at a higher temperature, and the room thermostat 6 will thereafter function to provide such additional combustion as will furnish the desired uniform or constant temperature in the room. Moreover, the switch 36 may be located in the same room as the thermostat 6, but at a location most apt to be influenced by outside temperature changes, or drafts, say at the baseboard, or below the stool of a window.

It must be understood that although dampers 2 and 3 are shown as the heat control elements of the furnace 4, by similarly applying the apparatus to the fuel supply system of an oil or gas-fired furnace, the same may be controlled exactly in the same manner. The term damper controller is, therefore, intended also to refer to a controller capable of being used with oil or gas-fired furnaces, or for operating any type of valve in a heating system, or other system controlled in accordance with a variable operating condition.

Figs. 5 and 6 illustrate in cross section the interior construction of the heaters and the manner of connecting the tubes to the outer wall of the expansible and contractible chamber. The lower end of the tube is tapered at 46, the end 47 entering an opening 48 in the outer wall. A jet 49 constructed in the form of a conically shaped nipple is inserted in the lower end 47 of tapered end 46 and connected thereto by means of a flange 50 and a soldering connection 51. A second soldering connection 52 is provided about the outside of a lower end 47 and the outer wall about the opening 48 to cooperate in providing a hermetical seal between the lower tube end 47 and the outer wall. Jet 49 is provided with an orifice or small opening 53.

The purpose of providing the jet 49 between the tube and the vessel is to effect a spraying action of the volatile fluid as the latter returns into the tube whereby to bring the volatile fluid rapidly into contact with the upper wall of the tube. I find that this spraying action of the volatile fluid, which is effected by jet 49, reduces the time required to cool the tube and effects a return of the motor substantially in one-sixth of the time required heretofore in the return of the fluid when the jet 49 was not employed.

Figure 7:
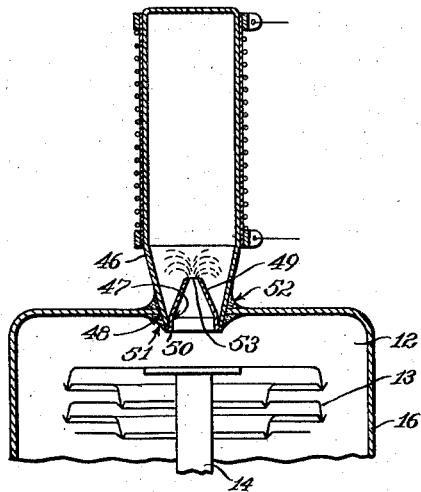
Figs. 7 to 10, inclusive, are vertical sectional views of the heat motor, but omitting the lower portion, whereby to illustrate structure effecting a quick return of the volatile fluid into the tube after the heat has been discontinued.
Figure 8:
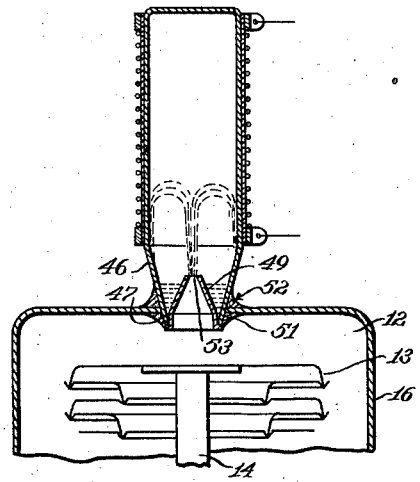
Figure 9:
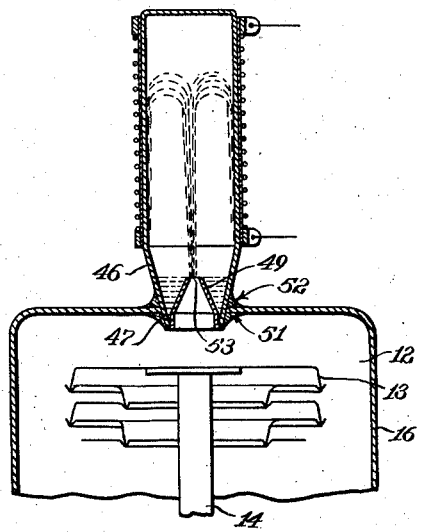

Figures 7 to 10, inclusive, illustrate approximately the manner the volatile fluid is returned into the tube by the jet 49. When the flow of current through the resistance coil is discontinued by the opening of the switch, which may be in the circuit controlling the flow of current, the upper walls of the tube will cool. At least a portion of the vapors in the tube which holds the unvaporized fluid in chamber 12 will condense and thereby destroy the pressure balance between the vapor in the tube and the pressure in chamber 12. After the initial cooling action, which effects initial condensation and drop of pressure, a slight bubbling or spraying of the volatile fluid through orifice 53 into the lower end of the tube will occur, as shown in Fig. 7. This slight bubbling or spraying will occur for a second or so when the spray will immediately take the form shown in Fig. 8. The next form taken by the spray is shown in Fig. 9. It seems that these various forms of the spraying action is not obtained by a slow rising of the spray stream in the tube to the positions shown in Figs. 8 and 9, but the change is by a spurting action of the stream from one spraying position to the other, which spurting action is rapid and causes a quick condensation of the vapor in the tube. This quick condensation not only shortens the time of the return stroke of the motor, but it permits of a quick action which is quite valuable in many cases, such as operation of certain types of gas valves.

Figure 10:
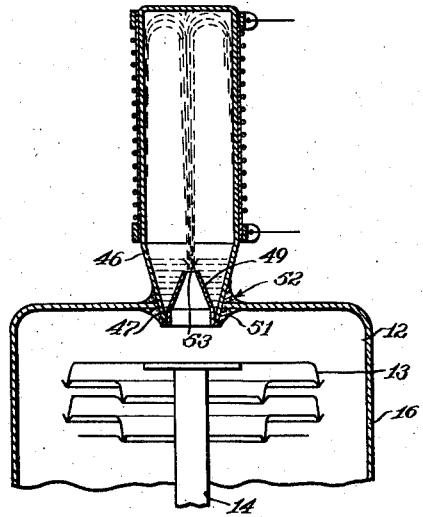

The time action of the spraying has been found to be relatively fast, and so much so that by the time the spray takes the form shown in Fig. 10, wherein the volatile fluid is being sprayed directly against the upper end of the tube, only enough volatile fluid has been returned into the tube to result in the liquid level shown in this Fig. 10, which liquid level is at that time slightly above the orifice 52. The fluid will be sprayed, however, through any liquid extending over the orifice 53, as shown in Fig. 10.

From experiments I have found that the heat motor will contract or accomplish its return stroke within 25 to 35 seconds, as compared to the formerly required time of three minutes. This time may vary somewhat, however, with vessels of different sizes and capacities. Although the expansible and contractible wall 13 is shown in the drawings as expanding on the return stroke, it is to be understood that the reverse action in the operation of this wall may be used, as illustrated in United States Letters Patent Number 1,885,285 granted November 1, 1932, to Lawrence M. Persons and assigned to the assignee of the present application. Moreover, it will be understood that the above explanation of the action of the fluid returning into the tube is the result of my observations during certain operations I have conducted, but, notwithstanding, I do not intend to be limited to this action. The invention is directed more broadly to the purpose of effecting a rapid cooling in considerably less time. The same result might obviously be obtained by a slight rearrangement of parts which would be within the contemplated scope of the invention. Variations in the details of the tube arrangement and heating means may be likewise employed without departing from the invention.

From the foregoing description of the invention, it will be apparent that the invention is directed to a new and improved form of motor shown and described in my aforesaid copending application, Serial Number 607,034, of which the present case is a division. Basically, the motor is capable of wide adaptation and can be used in various ways. For the purposes of apprising those skilled in the art of the manner in which the motor may be widely adapted, I have referred herein to several applications only, and not to each and every application thus far made by me, which, it is quite apparent, will be unnecessary to obtain a clear understanding of the invention, and of its purposes and principles of operation, in view of the explanation and description of the embodiments herein given as clearly illustrative of its broad field of use. The motor may be obviously used to operate dampers, valves, switches, or any other element or in any system requiring a prime mover.

Without further elaboration, the foregoing will so fully explain the gist of my invention that others may, by applying current knowledge, readily adopt the same for use under varying conditions of service, without eliminating certain features which may properly be said to constitute the essential items of novelty involved, which items are intended to be defined and secured to me by the following claims.

I claim:

1. A heat motor comprising, in combination, an expansible and contractible vessel and a plurality of substantially closed tubes in communication with said vessel, a volatile fluid in said vessel and said tubes, and means for displacing the fluid from one or both of said tubes into said vessel to produce a working stroke proportionate to said fluid displacement from one or both of said tubes comprising a heat coil for each tube providing a heating zone for the volatile fluid therein, and a circuit for each heat coil effecting a flow of current simultaneously through both or singly through one of said heat coils whereby to displace the fluid from both or one of said tubes into said vessel.

2. A heat motor comprising, in combination, an expansible and contractible vessel and a plurality of tubes in communication with said vessel, a volatile fluid in said vessel and said tubes, and means for displacing the fluid from one or both of said tubes into said vessel to produce a working stroke proportionate to said fluid displacement from one or both tubes comprising a separately controllable source of heat for each tube providing a heating zone for the fluid therein whereby to create a pressure by vaporization of a portion of the fluid and a displacement into said vessel of the unvolatilized fluid from one or both of said tubes.

3. A heat motor comprising, in combination, an expansible and contractible vessel and a plurality of substantially closed chambers in communication with said vessel, a volatile fluid in said vessel and said chambers, and means for displacing the fluid from one or both of said chambers into said vessel to produce a working stroke proportionate to said fluid displacement from one or both chambers comprising a resistance associated with each chamber and a source of electric energy in circuit with each resistance to provide a heating zone for the fluid in each chamber, and means for connecting one or both of said resistances in circuit with said source whereby to displace the fluid from one or both of said chambers into said vessel.

4. A heat motor comprising, in combination, an expansible and contractible vessel and a plurality of substantially closed chambers in communication with said vessel, a volatile fluid in said vessel and said chambers, and means for displacing the fluid in either or both of said chambers into said vessel to produce a working stroke proportionate to said fluid displacement from either or both of said chambers comprising a source of heat providing a heating zone for the fluid in each chamber, including connections associated therewith whereby to create a pressure by vaporization of a portion of the fluid and a displacement into said vessel of the unvolatilized fluid from either or both of said chambers.

5. A heat motor comprising, in combination, a work chamber, a heating chamber, and a fluid in said chambers whereby to form a closed fluid filled system, a work performing connection for said work chamber and adapted to do work in response to changes in pressure in said work chamber, means for creating a pressure in said heating chamber and consequently in said work chamber, and means associated with said first means for controlling the pressure by definite increments whereby to provide correspondingly definite predetermined movements for said work performing connection.

6. A heat motor having a contractible and expansible chamber, a volatile fluid in said chamber, a plurality of electric heat coils, and apparatus controlling the current flow through one or all of said heat coils to expand said chamber and produce predetermined working strokes according to the number of said heat coils energized.

7. A heat motor having a contractible and expansible chamber, a volatile fluid in said chamber, a pair of electric heat coils for influencing said volatile fluid, and apparatus controlling the current flow through either or both of said heat coils to expand said chamber and produce predetermined working strokes according to the number of heat coils energized.

GEORGE R. FOLDS.